US005108265A

United States Patent [19]

Koike

[11] Patent Number: 5,108,265

[45] Date of Patent: Apr. 28, 1992

[54] TEMPERATURE-DEPENDENT PRESSURE SWITCH AND PRESSURE CONTROL SYSTEM USING THE SWITCH

[75] Inventor: Ichiro Koike, Higashimatsuyama, Japan

[73] Assignee: Jidosha Kiki Co., Ltd., Tokyo, Japan

[21] Appl. No.: 563,145

[22] Filed: Aug. 3, 1990

[30] Foreign Application Priority Data

Aug. 11, 1989 [JP] Japan .................................. 1-209284

[51] Int. Cl.[5] .......................... F04B 49/08; G01L 7/16

[52] U.S. Cl. .......................................... 417/32; 417/38; 417/44; 303/10; 200/82 C; 200/82 D

[58] Field of Search ............... 417/32, 44, 38; 303/10, 303/11; 200/82 R, 82 C, 82 D

[56] References Cited

U.S. PATENT DOCUMENTS

| | | | |
|---|---|---|---|
| 4,608,870 | 9/1986 | Huber et al. | 200/82 E |
| 4,640,555 | 2/1987 | Bertling et al. | 303/10 |
| 4,827,093 | 5/1989 | Strzodka | 200/82 C |
| 4,867,645 | 9/1989 | Foster | 417/38 |
| 4,938,541 | 7/1990 | Shaw et al. | 303/10 |

*Primary Examiner*—Richard A. Bertsch

*Assistant Examiner*—David W. Scheuermann

*Attorney, Agent, or Firm*—Varndell Legal Group

[57] ABSTRACT

The temperature-dependent pressure detection switch according to the present invention comprises a pressure receiving member to receive hydraulic pressure, on which spring force of the predetermined value is permanently applied to the direction reverse to the operating direction of said hydraulic pressure and the spring force is varied according to temperature change, and a switch unit, which is operated by the movement of said pressure receiving member against said spring force when predetermined hydraulic pressure is received. Accordingly, when ambient temperature changes, spring force is changed, and the switchover setting pressure related to the on-off switchover operation of the switch unit can be changed according to temperature change. Namely, the pressure detection switch can be provided with temperature-dependent property. By the hydraulic pressure control system using the temperature-dependent pressure switch according to this invention, it is possible to accumulate the operating fluid in the accumulator in such quantity as necessary for operating hydraulic equipment.

20 Claims, 2 Drawing Sheets

TEMPERATURE-DEPENDENT PRESSURE SWITCH AND PRESSURE CONTROL SYSTEM USING THE SWITCH

BACKGROUND OF THE INVENTION

The present invention relates to a pressure detection switch, which is actuated by detecting the switchover setting pressure, and to a hydraulic pressure control system to cut off the power circuit of the motor for driving the pump by the operation of the above pressure detection switch when the accumulator pressure reaches the predetermined pressure.

In a hydraulic pressure control system using hydraulic pressure such as hydraulic braking system, the pump and accumulator are often used as pressure source. In such case, the operating fluid as discharged from the pump is accumulated in the accumulator at the predetermined pressure, and the operating fluid at the pressure necessary for operating hydraulic equipment such as hydraulic booster can be reliably and stably supplied to the hydraulic equipment. Also, the accumulator is provided with such function that it can operate the hydraulic equipment for a certain period of time even when pump is in trouble.

In this way, the accumulator can accumulate operating fluid of the predetermined pressure, whereas the continuous operation of the pump after the predetermined pressure is reached in the accumulator may result in useless waste of fuel and may shorten the service life of the pump.

In the conventional system, therefore, the hydraulic pressure control system is adopted, which stops the driving of the pump when accumulator reaches the preset pressure as shown in FIG. 3.

In FIG. 3, the hydraulic pressure control system is provided with the hydraulic pressure source, which comprises a pump 2 to supply the operating fluid to the hydraulic equipment 1 such as hydraulic booster, an accumulator 3 and a check valve 4 to allow only the flow of the operating fluid from the pump 2 to the accumulator 3. Further, the system is provided with a pressure detection switch 7', which is mounted on a power circuit 6 of the motor 5 to drive the pump 2. This pressure detection switch 7' detects that the pressure of the accumulator 3 reached the preset pressure and cuts off the power circuit 6. At the same time, the switch detects that the pressure of the accumulator 3 is reduced to lower than the preset pressure, and it controls the driving of the pump 2 by connecting the power circuit 6. Namely, the switchover setting pressure of this pressure detection switch 7' is set to the preset pressure of the accumulator 3.

It is possible by such hydraulic pressure control system to drive the pump 2 efficiently, and this contributes to the saving of fuel and to the improvement of the durability of the pump 2.

As it is evident from FIG. 4, the pressure detection switch 7' used in this hydraulic pressure control system comprises a pressure fluid inlet 8, into which the pressure fluid of the accumulator 3 is introduced, a piston 10, which receives the hydraulic pressure inside the pressure fluid inlet 8 on one end and also permanently receives the predetermined spring force by a compression coil spring 9' on the other end, a pushing unit 11 to be operated by the movement of the piston 10, and a permanently closed switch unit 12, which is turned off by the operation of this pushing unit 11 and cuts off the power circuit 6 of the motor 5.

Therefore, when the pressure fluid at the pressure fluid inlet 8 reaches the preset pressure to overcome the spring force of the spring 9', the piston 10 is moved against the spring force and moves the pushing unit 11 to the same direction. By the movement of the pushing unit 11, the switch 12 is turned off, and power circuit 6 is cut off. In this case, the spring force of the compression spring 9' is set to a constant value regardless of ambient temperature, and the switchover setting pressure of the pressure detection switch 7' is kept at a constant level regardless of ambient temperature.

However, if the switchover setting pressure of the pressure detection switch 7' is kept at a constant level regardless of ambient temperature, on-off control of the pump 2 is also set to a constant level regardless of ambient temperature. Thus, when ambient temperature is increased and internal pressure of the accumulator 3 is also increased with the internal pressure reaching a certain value, i.e. the internal pressure of the accumulator reaches a certain value with the increase of ambient temperature, the power circuit 6 is turned off by the pressure detection switch 7'. Accordingly, this leads to the problem that total quantity of pressure fluid accumulated in the accumulator 3 is reduced.

SUMMARY OF THE INVENTION

It is an object of the present invention to offer a pressure detection switch, which can change the switchover setting pressure according to the ambient temperature.

Another object of this invention is to offer a hydraulic pressure control system, which can accumulate the required quantity of pressure fluid in the accumulator without being influenced by ambient temperature through the adoption of such pressure detection switch.

To attain these objects, the temperature-dependent detection switch according to the present invention is characterized in that it comprises at least a pressure receiving member to receive the fluid pressure, a spring to permanently apply the spring force of the preset value on the above pressure receiving member to the direction reverse to the operating direction of said pressure fluid, said spring force being varied according to the temperature change, and a switch unit, which is operated by the movement of said pressure receiving member against said spring force when the preset hydraulic pressure is applied on it.

Also, the system according to this invention comprises a hydraulic equipment, a hydraulic pressure source provided with a pump and an accumulator to supply the operating fluid of preset pressure to this hydraulic equipment, and a pressure detection switch, which connects the power circuit of the motor to drive the pump when the pressure of the accumulator is lower than the switchover setting pressure and cuts off said power circuit by detecting the switchover setting pressure when the pressure of said accumulator reaches the switchover setting pressure. It is characterized in that it consists of a pressure receiving member to receive the hydraulic pressure, a spring to permanently apply the spring force of the preset value on the above pressure receiving member to the direction reverse to the operating direction of said pressure fluid, said spring force being varied according to the temperature change, and a switch unit, which is operated by the movement of said pressure receiving member against said spring force when the preset hydraulic pressure is applied on it and cuts off said power circuit.

The spring having the spring force varying according to the temperature change consists of a closed container made of an elastic material, for instance, and a gas spring containing gas sealed in this closed container.

In the temperature-dependent pressure detection switch according to this invention with the arrangement as described above, spring force is changed with the change of ambient temperature. Thus, the switchover setting pressure related to on-off switchover operation of the switch unit is changed in relation to the temperature change. Thus, the pressure detection switch is provided with temperature-dependent property.

In the hydraulic pressure control system using the temperature-dependent pressure detection switch based on this invention, the switchover setting pressure of the pressure detection switch is changed according to the temperature change, and the pump can be driven and controlled according to the temperature change. Because internal pressure of the accumulator is changed according to temperature change, pressure detection switch is not operated to cut off the power circuit even when internal pressure reaches the preset pressure before temperature changes. When the pressure inside the accumulator reaches the switchover setting pressure according to the temperature change, the pressure detection switch is operated and cuts off the power circuit, and the pump is stopped. When the pump is stopped, the operating fluid is accumulated in the accumulator in such higher quantity than the quantity determined by the preset pressure of the accumulator. Therefore, even when temperature is changed, the accumulator can accumulate the operating fluid in the quantity as necessary for the operation of the hydraulic equipment.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

In the following, the embodiments of the present invention will be described in connection with the drawings.

Figure 1:
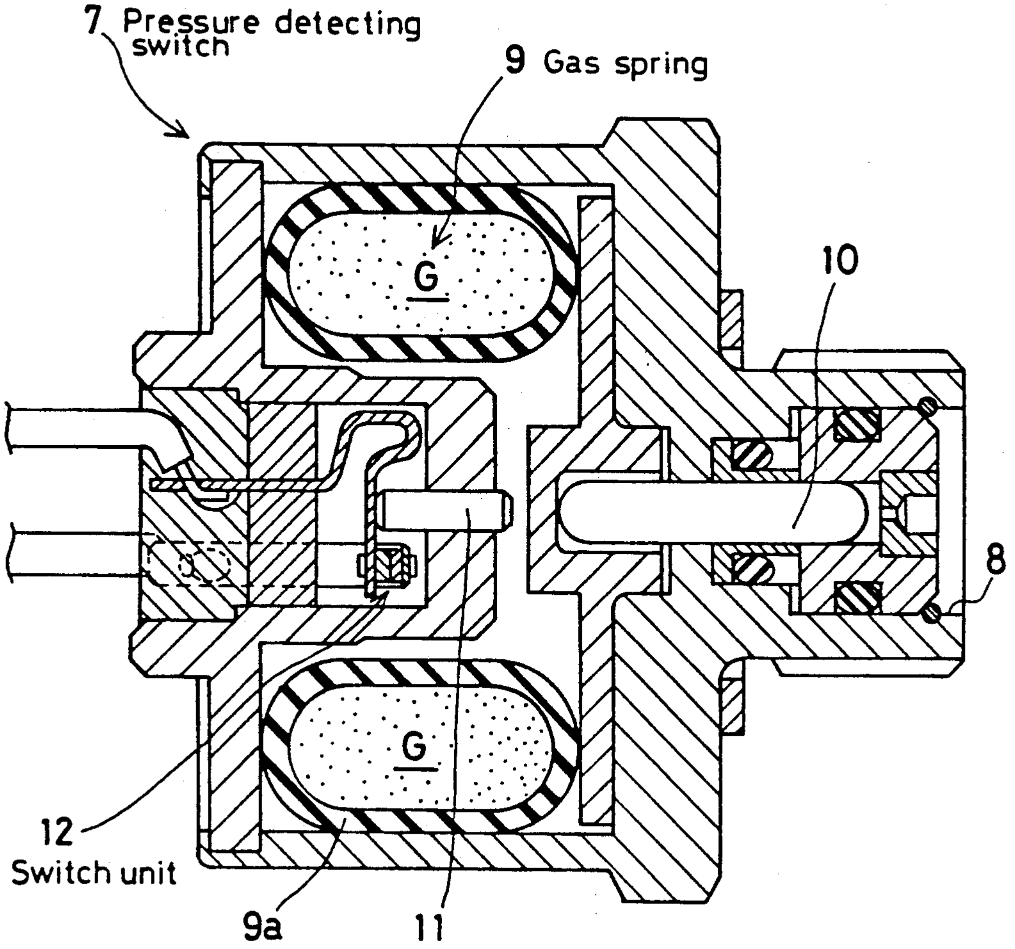
FIG. 1 is sectional view of an embodiment of a pressure detection switch according to the present invention.
Figure 4:
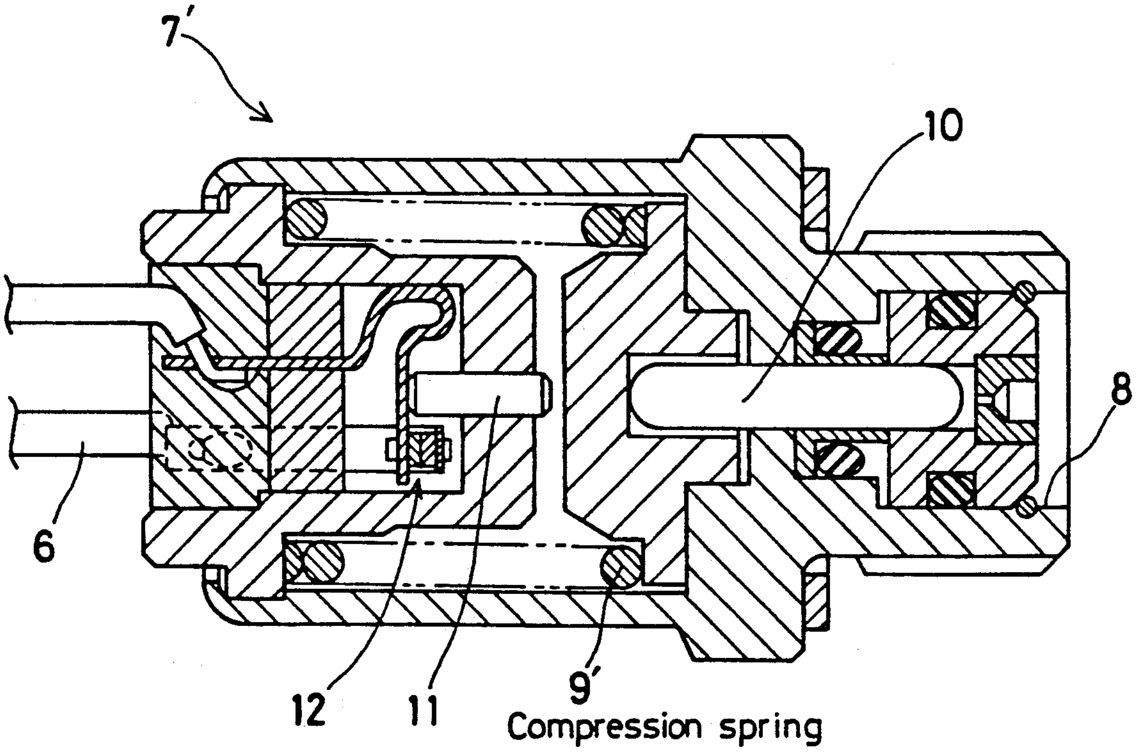
FIG. 4 PRIOR ART
FIG. 4 is a sectional view of a conventional type pressure detection switch.

FIG. 1 is a sectional view of an embodiment of a temperature-dependent pressure detection switch according to the present invention. The same numbers and symbols as on the conventional type pressure detection switch in FIG. 4 are used for the same components, and detailed description will not be given here.

As shown in FIG. 1, the spring to determine the switchover setting pressure of the temperature dependent pressure detection switch 7 consists of a gas spring 9 instead of compression coil spring 9' of the conventional type pressure detection switch 7'. This gas spring 9 is made of elastic material such as rubber, and the gas G with predetermined pressure is sealed in a ring-shaped closed container 9*a*. Therefore, pressure detection switch 7 is operated at the switchover setting pressure as determined by spring force corresponding to the sealing pressure of the gas G. In this case, the sealing pressure of the gas G is changed according to the ambient temperature change, and the switchover setting pressure is also changed depending upon the change of ambient temperature. Thus, the pressure detection switch 7 is provided with the temperature-dependent property.

Next, description is given on the operation of this embodiment.

When the pressure fluid introduced into the pressure fluid inlet 8 reaches the pressure to overcome the spring force of the gas spring 9, the piston 10 moves against the spring force and pushes the pushing unit 11 to the same direction. By the movement of this pushing unit 11, the permanently closed switch unit 12 is turned off.

When ambient temperature is increased, the gas G in the closed container 9*a* is expanded according to the temperature increase, and the pressure in the closed container 9*a* is raised. The spring force of the gas spring 9 is increased according to the temperature rise. As the result, the switchover setting pressure of pressure detection switch 7 is also increased.

Figure 2:
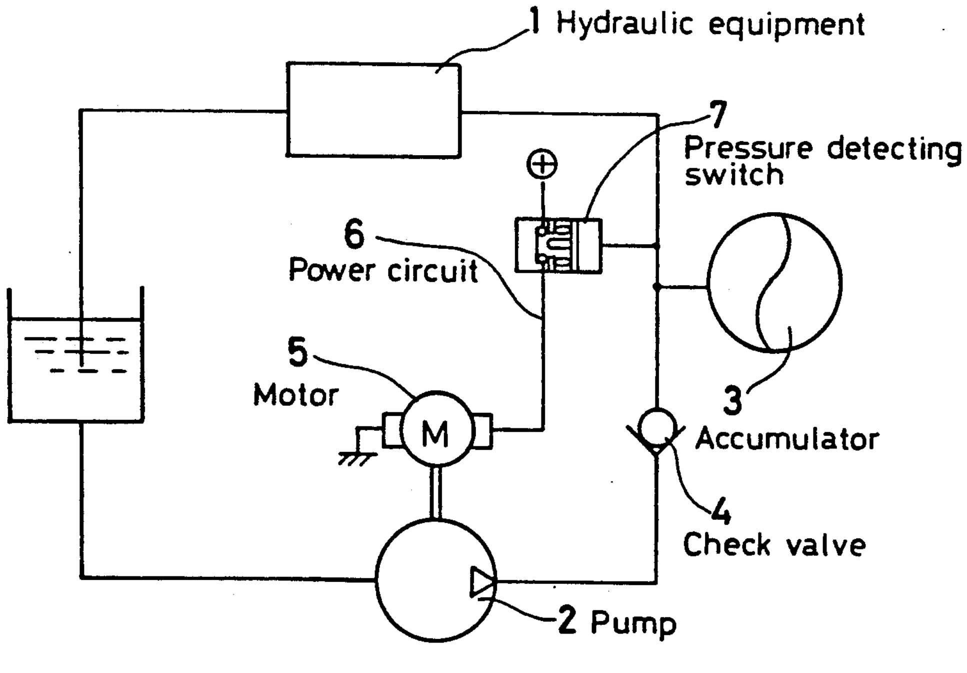
FIG. 2 is a circuit diagram of a hydraulic pressure control system using this pressure detection switch.

FIG. 2 shows the circuit diagram of an embodiment of the hydraulic pressure control system of this invention. The same component is represented by the same reference number as in the hydraulic pressure control system of FIG. 3, and detailed description is omitted here.

Figure 3:
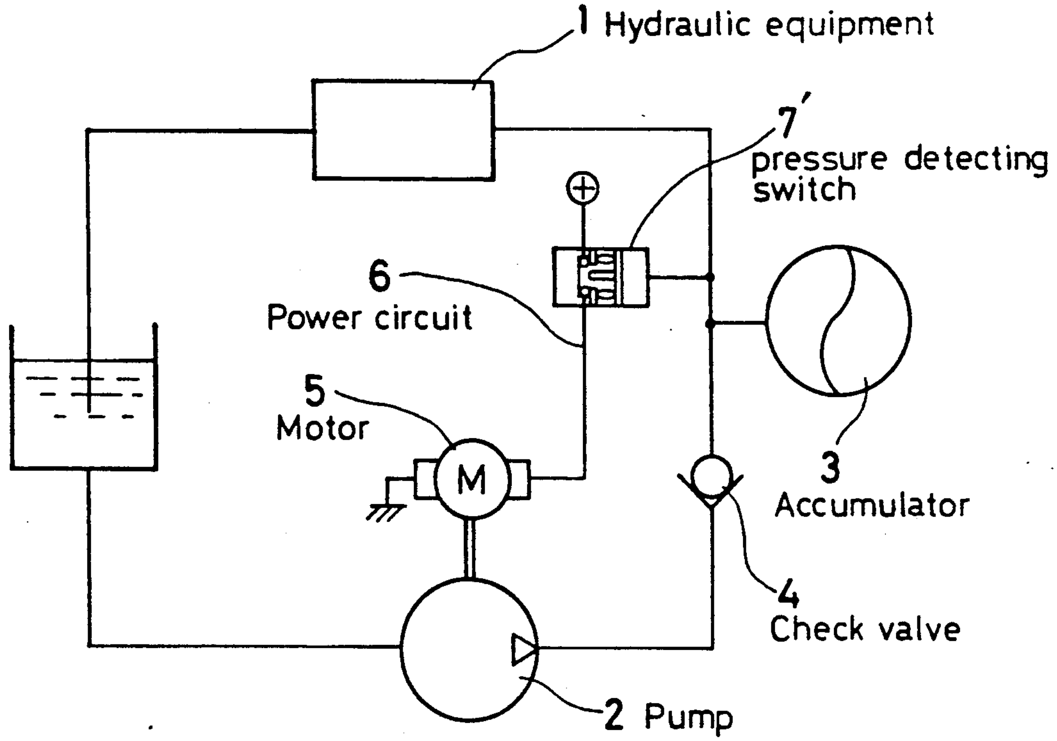
FIG. 3 PRIOR ART
FIG. 3 is a circuit diagram of a hydraulic pressure control system using a conventional type pressure detection switch.

As it is evident from FIG. 2, this hydraulic pressure control system is provided with the pressure detection switch 7 of FIG. 1 instead of the pressure detection switch 7' in the hydraulic pressure control system of FIG. 3.

In this embodiment, the pressure fluid of the accumulator 3 is introduced into the fluid pressure inlet 8. When fluid pressure in the pressure fluid inlet 8 approximately equivalent to the pressure of the accumulator 3 reaches the predetermined pressure to overcome the spring force of the gas spring 9, the piston 10 is moved against the spring force and pushes the pushing unit 11 to the same direction. By the movement of this pushing unit 11, the permanently closed switch unit 12 is turned off. Accordingly, the power circuit 6 is cut off, and the motor 5 and the pump 2 are stopped. When the pressure of accumulator 3 is decreased to lower than the predetermined pressure, the spring force of the gas spring 9 is increased to higher than the pressure in the fluid pressure inlet 8. Then, the piston 10 moves away from the switch unit 12, and the switch unit 12 is turned on. As the result, power circuit 6 is connected, and the motor 5 is driven.

When ambient temperature is increased, spring force of the gas spring 9 is increased according to the temperature increase. As the result, the switchover setting pressure of the pressure detection switch 7 is also increased. Therefore, even when the pressure inside the accumulator 3 reaches the switchover setting pressure before the temperature increase of the pressure detection switch 7, this pressure detection switch 7 is not operated. As the result, power circuit 6 is not cut off, and the motor 5 is continuously driven.

When the pressure in the accumulator 3 reaches the increased switchover setting pressure after the temperature increase of the pressure detection switch 7, the pressure detection switch 7 is operated, turning off the permanently closed switch unit 12 and cutting off the power circuit 6. As the result, the motor 5 and the pump 2 are stopped. When the pump 2 is stopped, the operating fluid is accumulated in the accumulator 3 in such quantity as necessary for the operation of the hydraulic equipment 1.

Thus, in the fluid pressure control system of this embodiment, the operating fluid can be accumulated in the accumulator 3 in such quantity as necessary for operating the hydraulic equipment 1 even when ambient temperature is changed.

The present invention is not limited to the above embodiment and various modifications and variations are conceivable.

For example, in the above embodiment, the closed container 9*a* with sealed gas G is formed in ring-shape, whereas it is possible to divide this closed container 9*a* into several pieces.

Also, the pressure detection switch 7 is formed as a permanently closed switch in the above embodiment, while this can be formed as a permanently open switch.

As it is evident from the above description, the spring force to set the switchover setting pressure for on-off switchover operation is changed in relation to the temperature change in the pressure detection switch of this invention. Therefore, the switchover setting pressure can be changed according to the temperature change.

Also, on-off control of the motor for driving the pump is performed by the pressure detection switch, in which the switchover setting pressure is changed according to the temperature change in the hydraulic pressure control system. Thus, even when internal pressure of the accumulator is increased according to the temperature increase, the operating fluid can be accumulated in the accumulator in such quantity as necessary for operating hydraulic equipment.

What we claim is:

1. A temperature-dependent pressure detection switch, comprising at least a pressure receiving member for receiving fluid pressure, a spring for permanently applying a spring force of a predetermined value on said pressure receiving member in a direction opposite to that of said fluid pressure, said spring force varying with temperature change, and a fixed switch unit, which is operated when said pressure receiving member is moved against said spring force as said predetermined fluid pressure is received by said pressure receiving member.

2. A temperature-dependent pressure detection switch as set forth in claim 1, wherein said spring consists of a closed container made of elastic material and a gas sealed in said closed container.

3. A hydraulic pressure control system, comprising at least a hydraulic equipment, a hydraulic pressure source provided with a pump and an accumulator for supplying operating fluid of a predetermined pressure to said hydraulic equipment, and a pressure detection switch for connecting a power circuit of a motor for driving said pump when a pressure of said accumulator is lower than a switchover setting pressure and for detecting said switchover setting pressure and for cutting off said power circuit when said pressure of said accumulator reaches said switchover setting pressure, a hydraulic pressure control system including a a temperature-dependent pressure detection switch, said pressure detection switch comprising a pressure receiving member for receiving fluid pressure, a spring for permanently applying spring force of a predetermined valve on said pressure receiving member in a direction opposite to that of said fluid pressure, said spring force varying with temperature change, and a fixed switch unit operated by the movement of said pressure receiving member against said spring force when said predetermined fluid pressure is received by said pressure receiving member.

4. A hydraulic pressure control system provided with a temperature-dependent pressure detection switch as set forth in claim 3, wherein said spring is a gas spring consisting of a closed container made of elastic material and a gas sealed in said closed container.

5. A temperature-dependent pressure detection switch, comprising a pressure receiving means for receiving fluid pressure; a switch means for performing a switch operation when engaged by said pressure receiving means, a spring means interposed between said pressure receiving means and said switch means for applying a spring force of a predetermined pressure on said pressure receiving means in a direction opposite to that of said fluid pressure, said switch means operating when said fluid pressure is greater than said spring force so that said pressure receiving means engages said switch means, and said spring force respectively increasing and decreasing in response to an increase and decrease in ambient temperature.

6. A temperature-dependent pressure detection switch as set forth in claim 1, wherein said fixed switch is fixed relative to movement of said spring.

7. A temperature-dependent pressure detection switch as set forth in claim 2, wherein said spring is ring shaped.

8. A temperature-dependent pressure detection switch as set forth in claim 1, wherein said spring and switch are arranged on a same side of said pressure receiving member.

9. A temperature-dependent pressure detection switch as set forth in claim 1, wherein said spring is interposed between said pressure receiving member and said switch.

10. A temperature-dependent pressure detection switch as set forth in claim 1, wherein said spring is arranged about said switch.

11. A temperature-dependent pressure detection switch as set forth in claim 3, wherein said fixed switch is fixed relative to movement of said spring.

12. A temperature-dependent pressure detection switch as set forth in claim 2, wherein said spring is ring shape.

13. A temperature-dependent pressure detection switch as set forth in claim 1, wherein said spring and said switch are arranged on a same side of said pressure receiving member.

14. A temperature-dependent pressure detection switch as set forth in claim 1, wherein said spring is interposed between said pressure receiving member and said switch.

15. A temperature-dependent pressure detection switch as set forth in claim 1, wherein said spring is arranged about said switch.

16. A temperature-dependent pressure detection switch as set forth in claim 5, wherein said switch means is fixed relative to movement of said spring means.

17. A temperature-dependent pressure detection switch as set forth in claim 5, wherein said spring means is a gas spring consisting of a closed container made of elastic material and a gas sealed in said closed container.

18. A temperature-dependent pressure detection switch as set forth in claim 5, wherein said spring means and said switch means are arranged on a same side of said pressure receiving means.

19. A temperature-dependent pressure detection switch as set forth in claim 5, wherein said spring means is interposed between said pressure receiving means and said switch means.

20. A temperature-dependent pressure detection switch as set forth in claim 5, wherein said spring means as arranged about said switch means.

* * * * *